United States Patent [19]

Gronfor

[11] Patent Number: 4,552,774
[45] Date of Patent: Nov. 12, 1985

[54] CHEESE-LIKE PRODUCT

[75] Inventor: Dennis I. Gronfor, Coon Rapids, Minn.

[73] Assignee: Land O'Lakes, Inc., Arden Hills, Minn.

[21] Appl. No.: 551,095

[22] Filed: Nov. 14, 1983

[51] Int. Cl.[4] .................. A23C 21/06; A23C 21/08
[52] U.S. Cl. .................................. 426/582; 426/583; 426/613; 426/578; 426/589
[58] Field of Search ............... 426/582, 583, 613, 578, 426/589

[56] References Cited

U.S. PATENT DOCUMENTS

| | | | |
|---|---|---|---|
| 1,748,781 | 2/1930 | Martin | 426/582 |
| 1,918,595 | 7/1933 | Frederiksen | 426/582 |
| 2,015,257 | 9/1935 | Clickner | 426/582 |
| 2,160,159 | 5/1939 | Lundstedt et al. | 426/582 |
| 2,279,202 | 4/1942 | Musher | 426/582 |
| 2,688,553 | 9/1954 | Schicks et al. | 99/117 |
| 3,741,774 | 6/1973 | Burkwall | 426/582 |
| 3,748,149 | 7/1973 | Walter et al. | 99/116 |
| 3,829,594 | 8/1974 | Schweizer, Jr. | 426/516 |
| 3,843,808 | 10/1974 | Ziccarelli | 426/583 |
| 3,857,977 | 12/1974 | Huessy | 426/583 |
| 3,917,854 | 11/1975 | Kasik et al. | 426/573 |
| 3,941,891 | 3/1976 | Kasik et al. | 426/94 |
| 4,031,254 | 6/1977 | Kasik et al. | 426/573 |
| 4,188,411 | 2/1980 | Kuipers et al. | 426/582 |
| 4,244,983 | 1/1981 | Baker | 426/582 |
| 4,312,891 | 1/1982 | Eisfeldt | 426/582 |
| 4,324,804 | 4/1982 | Davis | 426/36 |
| 4,341,801 | 7/1982 | Weissman | 426/582 |

*Primary Examiner*—Jeanette Hunter
*Attorney, Agent, or Firm*—Kinney & Lange

[57] ABSTRACT

A process for making a cheese-like product includes blending shredded cheese with a composition containing water, milk solids and functional whey proteins to form a mixture. Starch is added to the mixture up to 10% of the weight of the mixture. The mixture is then heated to an approximate temperature range of 140° F. to 190° F. and the starch and functional whey protein are permitted to gel and the cheese permitted to melt. The gelled mixture is then processed to reduce the cheese protein to an approximate particle size range of 5 to 325 microns.

30 Claims, 4 Drawing Figures

CHEESE-LIKE PRODUCT

BACKGROUND OF THE INVENTION

1. FIELD OF THE INVENTION

The present invention relates to a process for the production of a cheese-like product and to the cheese-like product. In particular, the present invention is directed to a process for producing a cheese-like product having a smooth non-grainy texture without the use of emulsifiers.

2. DESCRIPTION OF THE PRIOR ART

Natural cheese, when cooked, separates into a fat and a protein phase with the protein phase coagulating into a rubbery-type mass. To avoid the separation of the cheese into a fat and a protein phase and the coagulation of the protein, emulsifying salts, such as sodium phosphate, are commonly added to the cheese. The resulting product, known as processed cheese, melts uniformly and smoothly upon cooking. However, emulsifying salts, such as sodium phosphate, have been losing favor with consumers.

There has also been an advent of cheese-based products which have become popular for use in cooking applications. Emulsifiers have been extensively used in these products for inhibiting the casein protein from coagulation into rubbery-type particles.

The Martin U.S. Pat. No. 1,748,781 describes a process wherein natural cheese is ground or sliced into small pieces and is poured into a kettle and mixed with a dairy product, such as milk, cream or butter. The dairy product is 25–50% of the original weight of the cheese, or more. The mixture is heated to approximately 165° F. until the mass is liquid. At that time, an emulsifier is added. The liquid mass is then processed through a homogenizer to blend the mixture into a homogeneous mass.

The Schicks U.S. Pat. No. 2,688,553 also describes a process wherein finely ground cheese is mixed with anti-oxidants and aliphatic polyhydric alcohols and water soluble gum materials. The entire solution is gradually stirred until the mixture becomes uniform. The mixture is also processed through a homogenizer in a liquid state to produce a homogeneous mass that flows at room temperature.

SUMMARY OF THE INVENTION

The present invention includes the preparation of a cheese-like product without the use of emulsifiers and having a smooth non-grainy texture that can be subsequently cooked without separation of the fat phase from the protein. The process includes blending cheese with a composition containing water, milk solids and functional whey proteins to form a mixture and adding starch up to 10% by weight of the mixture. The mixture is heated to an approximate temperature range of 140° F. to 190° F., melting the cheese and permitting the starch and whey protein to gel. The gelled mixture is then processed to reduce the particle size of the cheese protein to a range between approximately 5 and 325 microns.

DETAILED DESCRIPTION OF THE PREFERRED EMBODIMENTS

Figure 1:
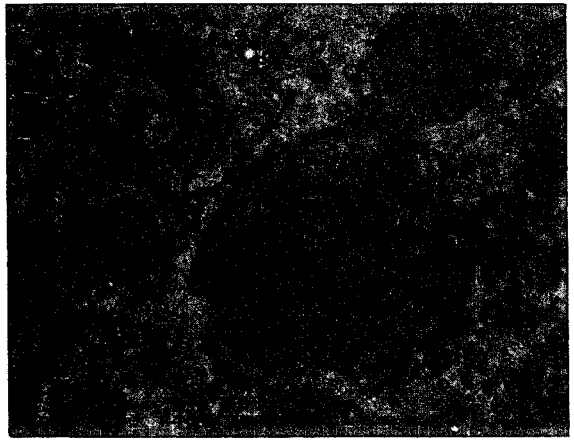
FIG. 1 is a photomicrograph of cheese casein particles magnified 100X in a starch/whey protein matrix prior to a high shear size reduction step.

The present invention includes a process for producing a viscous non-grainy cheese-like product. The cheese-like product includes thermally coagulated cheese casein particles in an approximate size range of between 5 to 325 microns interspersed in a starch/whey protein matrix. The product is characterized by the absence of emulsifiers, especially sodium-based emulsifiers, such as sodium phosphate.

The process includes providing cheese in a particulate form so that the cheese is blendable with starch, skim milk and an ultra-filtered milk containing functional whey proteins. The particulate cheese is provided by grinding or reducing in size large blocks of cheese. The method of size reduction is not particularly important to the present invention. The cheese is reduced in size by using conventional grinding or shredding equipment. The particle size to which the cheese is ground should be of a size that permits blending of the cheese with the starch, skim milk and ultra-filtered milk. One particle size range that has been used was between 1/16 of one inch to 1/32 of one inch thick and approximately one-half inch wide and approximately two to three inches long. Another particle size used was three inch cubes.

The type of cheese used in the process of the present invention will depend on the final flavor desired in the cheese-like product. For example, cheddar, provolone, colby, monterey jack, swiss, combinations of provolone and parmesan/romano, and cream cheese have been used with great success in producing cheese-like products of the present invention.

The particulate or shredded cheese is blended with the starch, skim milk and the ultrafiltered milk in a vessel having an agitator. The skim milk, ultrafiltered milk and cheese particles are blended together in approximately equal proportions. Starch is added up to 10% of the weight of the cheese/skim milk/ultrafiltered milk mixture.

The mixture is heated to an approximate temperature range of 140° F. to 190° F. and held until the starch and functional whey protein form a gel matrix. An important consideration in the type of starch used is that the starch must gel (react fully with water) in the approximate temperature range of 140° F. to 190° F. When the starch gels, the starch expands and provides a matrix that combines with the cheese casein protein so that areas of the casein protein become substantially separated. Above approximately 190° F., the cheese loses its flavor due to what is believed to be protein decomposition and loss of cheese flavor volatiles. Below approximately 140° F., the cheese does not melt and will not combine with the gelled starch to form a suitable matrix. A preferred temperature range for forming a suitable casein in starch matrix is approximately 165° F. to 185° F.

The amount of starch used in the present process is a function of the viscosity desired in the final product, the type of starch being used, and the solids content desired in the final product. However, a starch content above approximately 10% by weight of the cheese/skim milk-/ultrafiltered milk mixture, regardless of the type of starch or the final desired solids content, produces a product having too high a viscosity for a cheese-like product. A preferred minimum amount of starch needed to produce a matrix is approximately 3%; however, as little as 1% by weight of the cheese/skim milk-/ultra-filtered milk mixture has produced a suitable product regardless of the type of starch used. An amount of starch below approximately 1% produces a grainy product.

Corn, waxy maize and tapioca starches are suitable for use in the process of the present invention. One critical element that is required of the starch is that it fully expands at a temperature of less than 190° F. so that a suitable matrix is formed. Second, the starch must be able to withstand high shear stresses in a subsequent size reduction step. The following is a table identifying starches that are suitable for use in the process of the present invention within the parameters described above.

TABLE 1

| Trademark Sold Under | Type of Starch | Manufacturer |
|---|---|---|
| Pure Flo | Modified Corn | National Starch & Chemical Corp. |
| Perma Flo | Modified Corn | A. E. Staley Mfg. Co. |
| Consista | Modified Corn | A. E. Staley Mfg. Co. |
| F4-445 | Corn | National Starch & Chemical Corp. |
| (Flour) | Wheat | — |
| Durajel | Tapioca | National Starch & Chemical Corp. |
| Firmtex | Modified Corn | National Starch & Chemical Corp. |
| Sta-O-Paque | Modified Corn | A. E. Staley Mfg. Co. |
| Mira Cleer 340 | Modified Corn | A. E. Staley Mfg. Co. |
| Dressn 325 | Modified Corn | A. E. Staley Mfg. Co. |
| Therm-Flo | Modified Corn | National Starch & Chemical Corp. |
| Tenderfil 8 | Modified Tapioca | A. E. Staley Mfg. Co. |
| Purity CSC | Modified Corn | National Starch & Chemical Corp. |
| Frigex W | Modified Corn | National Starch & Chemical Corp. |

The ultrafiltered milk used in the instant process is defined as that milk which is processed through a series of membranes that permits water and some of the soluble minerals and lactose to pass through the membranes as permeate while retaining the milk proteins including the whey proteins and other solids on the membrane.

Ultrafiltration of milk is well known in the art. A typical example of ultra-filtered milk includes starting with whole milk having a solids content of approximately 12.5% solids including 3.5% fat, with the whole milk being concentrated to a total solids content of approximately 40%. The resulting ultra-filtered milk contains two types of proteins. The first type of protein is casein which is the major protein constituting cheese. The second protein in the ultra-filtered milk is functional whey protein. The whey protein, in the typical example of ultra-filtered milk given above, constitutes approximately 4% of the total weight of the ultra-filtered milk.

For purposes of the present specification, the term "functional whey protein" means that whey protein which has the capability to form a gel (will fully react with water) when heat is applied in what is believed to be a complex. In contrast, non-functional or denatured whey protein is that protein that has been altered typically through a well known heating process and will not form an effective gel (will not fully react with water).

Alternatively, the milk can be concentrated and the functional whey protein retained by reverse osmosis. Reverse osmosis, however, retains some of the minerals and lactose that ultra-filtration allows to pass as permeate.

Although ultra-filtered milk is preferred in the process of the present invention, a commercially-available whey protein concentrate having a functional whey protein fraction can also be used. The whey protein concentrate, however, must be one that has been subjected to minimal high temperature treatment. Preferably, the temperature treatment of the whey protein has been kept below approximately 140° F. Typically, the whey protein concentrate is obtained as a byproduct from the production of cheese.

The functional whey protein adds to the viscosity of the cheese-like food prouct, contributes a creaminess to the final product and produces a sheen which is aesthetically appealing to the consumer. Experiments using milk concentrates wherein the whey protein was not retained or wherein the whey protein was denatured, did not produce a final cheese-like product which exhibited the same smooth creamy properties and which was not as viscous as the product made with functional whey protein. Preferably, a minimum of approximately 0.5% of functional whey protein by weight of the final product is needed to produce a product with the characteristics described above.

Skim milk is added to the mixture to provide sufficient water for reaction with the starch and the functional whey protein. Alternatively, plain water can be used instead of skim milk and the solids content of the ultra-filtered milk increased to achieve a solids content comparable to the solids content of ultrafiltered milk and skim milk. Alternatively, a functional whey protein concentrate containing sufficient milk solids can be used instead of the combination of ultra-filtered milk and skim milk. However, ultra-filtered milk and skim milk are preferred due to product labeling considerations.

After the mixture has been heated to the approximate temperature range of 140° F. to 190° F., the starch and whey protein are allowed to gel until the mixture reaches a viscosity of at least approximately 10,000 centipoise and preferably 15,000 to 20,000 centipoise. Typically, the time needed to reach approximately 15,000 to 20,000 centipoise is approximately 3.5 minutes.

The hot gelled mixture is processed through a high shear sizing device that reduces the casein protein areas within the starch/whey matrix to an approximate particle size range of less than 325 microns and preferably between approximately 5 and 325 microns. In one example of the process, a high shear mixer marketed under the name of "Tekmar" Model SD-45 by Tekmar Corporation of Cincinnati, Ohio, successfully reduced the casein protein to an approximate size range of 5 to 325 microns. The high shear mixer has a blade system that turns at approximately 3500 rpm. In another example, an Urschel Microcutter, manufactured by Urschel Laboratories of Valparaiso, Ind., was used to reduce the mixture to a particle size below 325 microns. The Urschel Microcutter permits continuous size reduction of the casein protein through a plurality of stationary blades and an impeller forcing the gelled mixture against the blades. The impeller turned at approximately 9600 rpm.

Although the exact mechanism is not known, it is believed that the starch/whey protein matrix aids in reducing the casein particles to a size range between 5 and 325 microns and contributes significantly to the creamy non-grainy texture of the final product. As stated previously, the cheese casein proteins have an affinity for each other. Upon heating, the casein proteins separate from the fat in the cheese and further coagulate into rubbery-type clumps. The clumps result in a product having a grainy texture. In the past, to prevent clumping, emulsifiers such as sodium phosphate have been added to the cheese. In the present invention, the thermal coagulation is not directly prevented since no emulsifiers are used. However, the starch/whey protein matrix appears to inhibit the degree of clumping, or the nature of the clumps experienced in the past, by keeping the casein protein areas separated. The matrix presents the casein protein areas to the high shear sizing device so that a uniform particle size below 325 microns is achieved.

Figure 2:
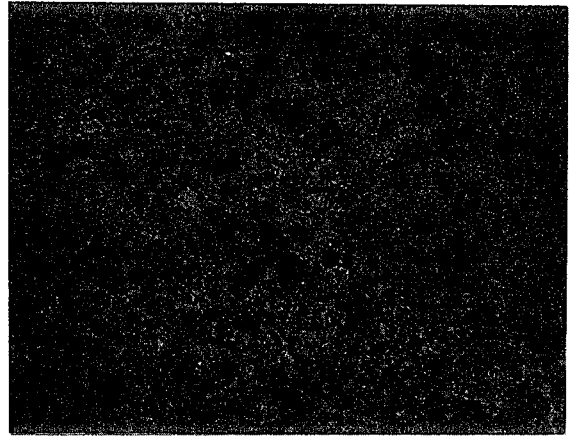
FIG. 2 is a photomicrograph of cheese casein particles magnified 100X in a starch/whey protein matrix after the high shear size reduction step.

FIG. 1 is a photomicrograph of the gelled starch/whey protein matrix containing coagulated casein particles. Prior to processing in the high shear sizing device, the casein particles have been kept generally within the size range of 800 to 1,000 microns by the starch/whey protein matrix. FIG. 2 is a photomicrograph of the product having been processed through an Urschel Microcutter using a Model No. 212-084 blade and the impeller at a speed of 9,3000 r.p.m. The particle size of the casein protein was in the approximate range of 5-70 microns. The product was characterized by a creamy, non-grainy texture.

Figure 3:
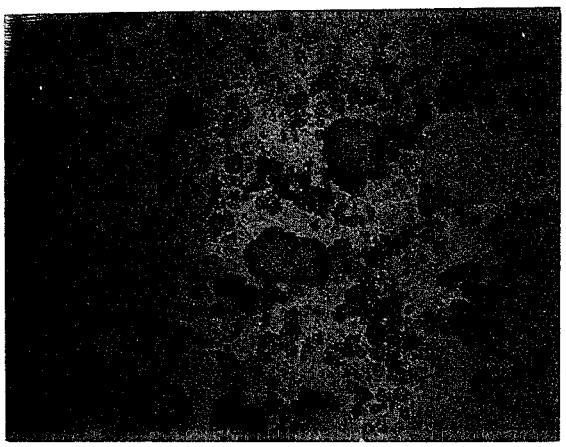
FIG. 3 is a photomicrograph of cheese casein particles magnified 100X in a starch/whey protein matrix having a larger particle size distribution than the example in FIG. 1.

FIG. 3 shows the product with a casein particle size distribution between 5 and 225 microns, averaging approximately 80 microns with many particles in the approximate range of 100 to 150 microns. The product was processed near the high end of the preferred temperature range through the Urschel Microcutter using a Model No. 212-084 blade head with the impeller at a speed of 9,3000 r.p.m. The product was characterized as having a rougher texture than the product shown in FIG. 2, but well within an acceptable level of smoothness.

Figure 4:
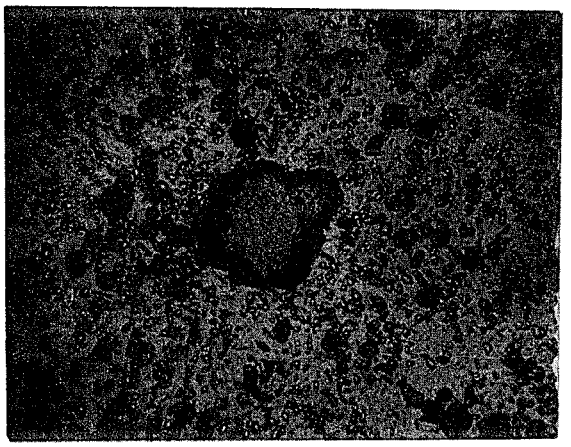
FIG. 4 is a photomicrograph of cheese casein particles magnified 100X in a starch/whey protein matrix of a product having a marginally acceptable particle size distribution.

FIG. 4 shows the product with a casein particle size distribution between 5 and 325 microns with many particles 200 microns large. The product was processed through the Urschel Microcutter using a Model No. 212-084 blade head which permits coarse cutting with the impeller at a speed of 11,000 r.p.m. The product was characterized as having a marginally smooth texture.

The following examples are presented to illustrate the present invention and are not intended to limit its scope.

EXAMPLE 1

A cheddar cheese product was prepared in the following manner:

25 pounds of skim milk and 256 pounds of ultra-filtered milk having a solids content of approximately 40% were added in a vat and mixed well. 9.6 pounds of a modified corn starch sold under the trademark Consista by A. E. Staley Mfg. Co. and 14.5 pounds of a modified corn starch sold under the trademark of Permaflo by A. E. Staley Mfg. Co. were added to the vat and mixed in with the skim milk and ultra-filtered milk. Salt, preservatives and color were then added to the vat.

Large blocks of cheddar cheese (40 pounds) were shredded into two to three-inch long strips. 256 pounds of the shredded cheddar cheese was added under agitation into the vat. The shredded cheddar was added under agitation to prevent the cheese from floating on top of the mixture and to ensure a good distribution of the cheese particles within the mixture. The mixture was heated to approximately 100° F. in the vat.

The heated mixture was then pumped through a swept-surface heat exchanger wherein the temperature of the mixture was raised to approximately 180° F. The mixture was kept at approximately 180° F. for approximately 3.5 minutes before being fed into an Urschel Microcutter device which is manufactured by Urschel Laboratories, Incorporated of Valparaiso, Ind. A Model No. 212-084 Urschel cutting head was used to reduce the casein protein particle size in the range of 5-70 microns as illustrated in FIG. 1. The product produced was characterized by a smooth texture with no separation of the product upon cooking.

EXAMPLES 2-14

EXAMPLES 2-14 were run using substantially the same procedure as described in EXAMPLE 1, except that the type of starch and amount of starch was varied as follows:

| Example | Trademark Sold Under | Type of Starch | Amount (lbs.) |
|---|---|---|---|
| 2 | Pure Flo | Modified Corn Starch | 15.2 |
| 3 | Pure Flo | Modified Corn Starch | 19.8 |
| 4 | Pure Flo | Modified Corn Starch | 22.8 |
| 5 | F4-445 | Corn Starch | 20.6 |
| 6 | | Unmodified Wheat Flour | 22.8 |
| 7 | | Unmodified Wheat Flour | 38.1 |
| 8 | Durajel | Tapioca Starch | 22.8 |
| 9 | Firmtex | Modified Corn Starch | 19.1 |
| 10 | Sta-O-Paque | Modified Corn Starch | 30.5 |
| 11 | Mira Cleer 340 | Modified Corn Starch | 30.5 |
| 12 | Dressn 325 | Modified Corn Starch | 30.5 |
| 13 | Therm-Flo | Modified Corn Starch | 22.8 |
| 14 | Tenderfil 8 | Modified Tapioca Starch | 22.8 |

The product produced in each of the EXAMPLES 2-14 was a satisfactory smooth cheese-like product characterized by no separation of the product upon cooking.

EXAMPLE 15

Example 15 was run using substantially the same procedure as in Example 1, except that Quarg was substituted for the ultra-filtered milk. The Quarg was made using an ultrafiltration step instead of the conventional centrifugation step in order to retain the whey protein. The product produced was characterized by substantially the same creamy texture as the product in Example 1 with no separation upon cooking.

EXAMPLE 16

280 pounds of whole milk and 27.2 pounds of water were mixed with 24 pounds of unmodified wheat flour and 160 pounds of a whey protein concentrate. The whey protein concentrate included a functional whey protein fraction of 30% on a weight basis as determined by Kjeldahl nitrogen x 6.38 and corrected for non-protein nitrogen.

288 pounds of cheddar cheese shredded in the manner described in example 1 was then added to the mixture along with 9.6 pounds of salt. The mixture was then processed in substantially the same manner as described in Example 1. The resulting product had a non-grainy, creamy texture with no separation occurring upon cooking.

Although the present invention has been described with reference to preferred embodiments, workers skilled in the art will recognize that changes may be made in form and detail without departing from the spirit and scope of the invention.

What is claimed is:

1. A process for producing a cheese-like product comprising:
    mixing cheese particles with a composition containing water, milk solids and functional whey protein along with a starch, the starch being added up to 10% of the weight of the entire mixture;
    heating the mixture to a temperature range between approximately 140° F. and 190° F.;
    holding the mixture between 140° F. and 190° F., until the starch and the functional whey protein react with the water and the cheese particles melt within the starch and functional whey protein to form a starch/whey protein matrix containing cheese particles;
    processing the matrix containing cheese particles after the starch/whey protein matrix is formed to reduce in size the cheese particles to an approximate size range between 5 and 325 microns.

2. The process of claim 1 wherein the composition containing water, milk solids and functional whey protein includes a composition comprising skim milk and ultra-filtered milk.

3. The process of claim 2 wherein the ultra-filtered milk has an approximate 40% solids content.

4. The process of claim 2 wherein the skim milk, ultra-filtered milk and cheese particles are combined in substantially equal proportions.

5. The process of claim 2 wherein the functional whey protein constitutes approximately 4% by weight of the ultra-filtered milk.

6. The process of claim 1 wherein the starch is a corn starch.

7. The process of claim 1 wherein the starch is a modified corn starch.

8. The process of claim 1 wherein the starch is an unmodified wheat flour.

9. The process of claim 1 wherein the starch is a tapioca starch.

10. The process of claim 1 wherein the starch is added in an amount between approximately 1% and 10% of the weight of the entire mixture.

11. The process of claim 1 wherein the starch content is approximately 3% of the entire mixture.

12. The process of claim 1 wherein the cheese particles are particles of cheese selected from the group consisting of cheddar, provolone, colby, monterey jack, swiss and cream cheese.

13. The process of claim 1 wherein the mixture is held between 140° F. and 190° F. until a viscosity of 10,000 centipoise is reached.

14. The process of claim 1 wherein the mixture is held between 140° F. ad 190° F. until a viscosity of 15,000 centipoise is reached.

15. The process of claim 1 wherein the mixture is held within an approximate temperature range of 165° F. to 185° F. until the starch and functional protein react as described.

16. The process of claim 15 wherein the mixture is held for approximately 3.5 minutes within the temperature range of 140° F. to 190° F.

17. The process of claim 1 wherein the matrix containing cheese particles is processed through a high shear sizing device.

18. The process of claim 1 wherein the cheese particles are reduced in size to achieve an approximate particle size range of 5 to 70 microns.

19. The process of claim 1 wherein the composition containing water, milk solids and functional whey protein includes a whey protein concentrate having a functional whey protein fraction of 30% on a weight basis, whole milk and water.

20. The process of claim 19 wherein the starch is an unmodified wheat flour.

21. A cheese-like product characterized by a non-grainy, smooth texture exhibiting substantially no separation of cheese protein from fat serum upon cooking produced by the process of claim 1.

22. The product of claim 21 wherein the cheese product is characterized by a viscosity of at least 10,000 centipoise at a temperature range between 140° F. and 190° F.

23. A cheese-like product comprising cheese particles in an approximate size range between 5 and 325 microns randomly interspersed with a matrix consisting of starch, milk solids and whey protein, the starch and the whey protein having been fully reacted with water and the starch being below approximately 10% of the weight of the entire mixture.

24. The cheese-like product of claim 23 wherein the cheese is selected from the group consisting of cheddar, provolone, colby, monterey jack, swiss and cream cheese.

25. The cheese-like product of claim 23 wherein the starch is selected from a group consisting of modified and unmodified corn starch, unmodified wheat flour and tapioca starch.

26. The product of claim 23 wherein the starch content is between approximately 1% and 10% by weight of the entire mixture.

27. The product of claim 23 wherein the starch content is approximately 3% by weight of the entire mixture.

28. A cheese-like product comprising cheese particles interspersed in a food composition, the cheese particles being below approximately 325 microns in size, the cheese particles and the food composition being substantially free of emulsifiers and being characterized with a smooth texture and no separation of the product upon cooking.

29. The product of claim 28 wherein the product is substantially free of emulsifiers containing sodium.

30. An improved process for producing a cheese-like produce wherein cheese particles are mixed with a composition containing water, milk solids and functional whey protein along with a starch and heated to a temperature range that melts the cheese particles and does not burn the starch, and holding the mixture at said temperature range until the starch and the functional whey protein react with the water and the cheese particles melt with the starch and functional whey protein to form a starch/whey protein matrix containing cheese particles; the improvement comprising:

processing the matrix containing cheese particles to reduce in size the cheese particles to an approximate size range between 5 and 325 microns.

* * * * *